US011086595B2

(12) United States Patent
Ueno et al.

(10) Patent No.: US 11,086,595 B2
(45) Date of Patent: Aug. 10, 2021

(54) ELECTRONIC DEVICE HAVING CHARACTER INPUT FUNCTION, AND METHOD OF CONTROL THEREOF

(71) Applicant: KYOCERA Corporation, Kyoto (JP)

(72) Inventors: Yasuhiro Ueno, Yokohama (JP);
Shigeki Tanabe, Yokohama (JP);
Hideki Morita, Yokohama (JP); Isao Masuike, Machida (JP); Koutaro Yamauchi, Yokohama (JP); Manabu Sakuma, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 247 days.

(21) Appl. No.: 15/794,791

(22) Filed: Oct. 26, 2017

(65) Prior Publication Data
US 2018/0121162 A1 May 3, 2018

(30) Foreign Application Priority Data
Oct. 27, 2016 (JP) .............................. JP2016-211017

(51) Int. Cl.
*G06F 3/16* (2006.01)
*G06F 3/0488* (2013.01)
(Continued)

(52) U.S. Cl.
CPC ............ *G06F 3/167* (2013.01); *G06F 1/1686* (2013.01); *G06F 3/012* (2013.01); *G06F 3/0304* (2013.01); *G06F 3/04886* (2013.01); *G06F 40/174* (2020.01); *G10L 15/22* (2013.01); *G10L 2015/223* (2013.01)

(58) Field of Classification Search
CPC ........... G06F 3/167; G06F 3/012; G10L 15/22
See application file for complete search history.

(56) References Cited

U.S. PATENT DOCUMENTS 6,879,958 B1 * 4/2005 Kojima ................... G10L 15/26
704/275
8,165,886 B1 * 4/2012 Gagnon .................. G10L 15/19
704/275

(Continued)

FOREIGN PATENT DOCUMENTS

EP 1081587 A2 3/2001
JP 2001-75774 A 3/2001
(Continued)

*Primary Examiner* — Ariel Mercado
(74) *Attorney, Agent, or Firm* — Hauptman Ham, LLP

(57) ABSTRACT

An electronic device includes a microphone; a display; a touch panel; and a controller. The controller is configured to start accepting, through the microphone, a specific voice command input. The controller is configured to start accepting voice input in response to a text input field being displayed on the display, wherein the accepting voice input includes converting voice inputted through the microphone into text, and inputting the converted text into the text input field. During the accepting voice input, when a predetermined word corresponding to a specific voice command is recognized, the controller is configured to determine whether voice is inputted through the microphone during two intervals of a predetermined duration before and after the predetermined word, respectively.

12 Claims, 11 Drawing Sheets

(51) Int. Cl.
    *G06F 3/03*         (2006.01)
    *G06F 1/16*         (2006.01)
    *G06F 40/174*     (2020.01)
    *G06F 3/01*         (2006.01)
    *G10L 15/22*      (2006.01)

(56) References Cited

U.S. PATENT DOCUMENTS

| | | | |
|---|---|---|---|
| 8,791,918 B2 | 7/2014 | Sudo | |
| 2010/0009720 A1* | 1/2010 | Cha | G06F 3/167 455/566 |
| 2013/0111487 A1* | 5/2013 | Cheyer | G06F 17/3087 718/102 |
| 2013/0275875 A1* | 10/2013 | Gruber | H04L 67/12 715/728 |
| 2014/0218372 A1* | 8/2014 | Missig | G06F 3/044 345/473 |
| 2015/0348548 A1* | 12/2015 | Piernot | G10L 15/22 704/235 |
| 2016/0125881 A1* | 5/2016 | Vogel | G06F 40/30 704/9 |
| 2016/0321266 A1* | 11/2016 | Philippov | G06F 3/167 |
| 2018/0325469 A1* | 11/2018 | Fountaine | H04W 4/90 |

FOREIGN PATENT DOCUMENTS

| | | |
|---|---|---|
| JP | 2012-221179 A | 11/2012 |
| JP | 2015-501022 A | 1/2015 |
| WO | 2013/048880 A1 | 4/2013 |

\* cited by examiner

ELECTRONIC DEVICE HAVING CHARACTER INPUT FUNCTION, AND METHOD OF CONTROL THEREOF

CROSS-REFERENCE TO RELATED APPLICATION(S)

The present application claims priority under 35 U.S.C. § 119 to Japanese Patent Application No. 2016-211017, filed on Oct. 27, 2016, entitled "ELECTRONIC DEVICE, METHOD OF CONTROL, AND COMPUTER CODE". The content of which is incorporated by reference herein in its entirety.

FIELD

The present disclosure relates to an electronic device having a character input function.

BACKGROUND

Conventional mobile phones (character input devices) include a touch panel for detecting a contact operation and a controller for displaying a plurality of buttons associated with respective characters on the touch panel. In a case where a contact to the touch panel is maintained after the contact has been started at a first position on the touch panel on which a plurality of buttons are displayed, when a certain contact operation is detected, the controller of the mobile phone accepts an input of a character corresponding to the button displayed on the position on which the certain contact operation has been detected.

SUMMARY

An electronic device according to one aspect includes a voice input unit, a display, a touch panel, and a controller. The controller is configured to accept an input of a voice if a text input field on which a touch operation is performable is displayed on the display and input a text corresponding to the voice to the text input field if the voice is input to the voice input unit.

Further, an electronic device according to one aspect includes a voice input unit, a display, a touch panel, and a controller. The controller is configured to accept an input of a voice if a software keyboard is displayed on the display and to input a text corresponding to the voice to the text input field if the voice is input to the voice input unit.

A control method according to one aspect of an electronic device that includes a voice input unit, a display, a touch panel, and a controller. The control method includes if a text input field on which a touch operation is performable or a software keyboard is displayed on the display, accepting an input of a voice, and if the voice is input to the voice input unit, inputting a text corresponding to the voice to the text input field.

DETAILED DESCRIPTION

Embodiments according to the present disclosure will now be described in detail with reference to the drawings. It should be noted that the embodiments are not intended to limit the scope of the present disclosure. Structural elements in the following description include their equivalents such as what the skilled person could have easily conceived of and what are substantially the same. Like numerals indicate like components in the description of the drawings, and these components may not be repeatedly described. Users of electronic devices may feel it troublesome to input characters through a contact operation such as a manual input.

An electronic device 1 according to some embodiments of the present disclosure can be implemented as a device such as a smartphone without being limited thereto. The electronic device 1 may be a tablet, a personal computer, an in-car electronic device, and others.

Figure 1:
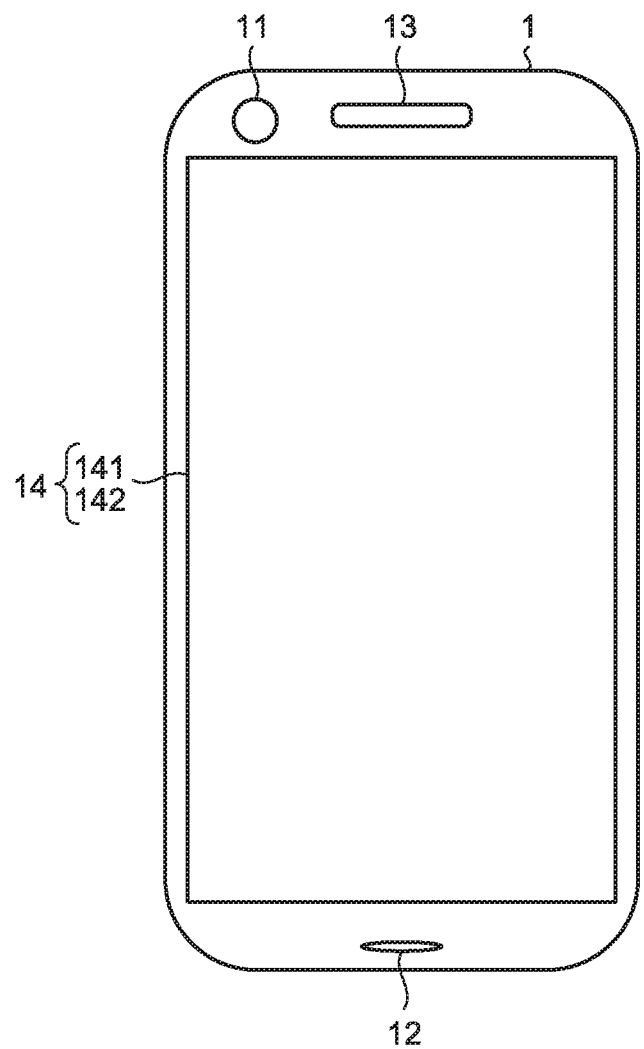
FIG. 1 is an outline view of an electronic device according to some embodiments.

FIG. 1 is an outline view of the electronic device 1 according to the embodiments. As illustrated in FIG. 1, the electronic device 1 includes a camera 11, a microphone 12 as a voice input unit, a speaker 13 as a voice output unit, and a touch screen display 14.

The camera 11 electronically takes images using an imaging sensor such as a charge coupled device (CCD) and a complementary metal oxide semiconductor (CMOS). The camera 11 is an in-camera taking an image of an object facing the touch screen display 14. The electronic device 1 may further include an out-camera taking an image of an object facing a surface opposite to the touch screen display 14.

The microphone 12 is one of input means that accept an input to the electronic device 1. The microphone 12 collects sounds around itself.

The speaker 13 is one of output means that make an output from the electronic device 1. The speaker 13 outputs voice on the phone, information of various kinds of computer codes, and others by voice.

The touch screen display 14 includes a touch panel 141 and a display 142.

The touch panel 141 is one of input means that accept an input to the electronic device 1. The touch panel 141 detects contact of a finger of a user, a stylus, and others. Examples of a method for detecting contact include a resistive touch method and an electrostatic capacitance method; however, any desired method is applicable.

The display 142 is one of output means that make an output from the electronic device 1. The display 142 displays objects such as characters, images, signs, and figures on the screen. For example, a liquid crystal display and an organic electroluminescence (EL) display may be used for the display 142.

In the touch screen display 14 in FIG. 1, the display 142 is provided in such a manner as to overlap with the touch panel 141, and the display field of the display 142 overlaps with the touch panel 141; however, the embodiments are not limited thereto. The display 142 and the touch panel 141 may be provided side by side or provided apart from each other. In the case that the display 142 overlaps with the touch panel 141, at least one side of the display 142 does not necessarily fit with any side of the touch panel 141.

The electronic device 1 determines the type of a gesture based on contact, the position of the contact, a time of the contact, and a change over time in the position of the contact that are each detected by the touch screen display 14. The gesture is an operation performed on the touch screen display 14. Examples of the gesture determined by the electronic device 1 include, but are not limited to, touching, releasing, and tapping.

Touching is a gesture in which a finger contacts the touch screen display 14. A gesture in which a finger contacts the touch screen display 14 is determined to be touching by the electronic device 1.

Releasing is a gesture in which a finger gets apart from the touch screen display 14. A gesture in which a finger gets apart from the touch screen display 14 is determined to be releasing by the electronic device 1.

Tapping is a series of gestures of touching and releasing. A series of gestures of touching and releasing is determined to be tapping by the electronic device 1.

Figure 2:
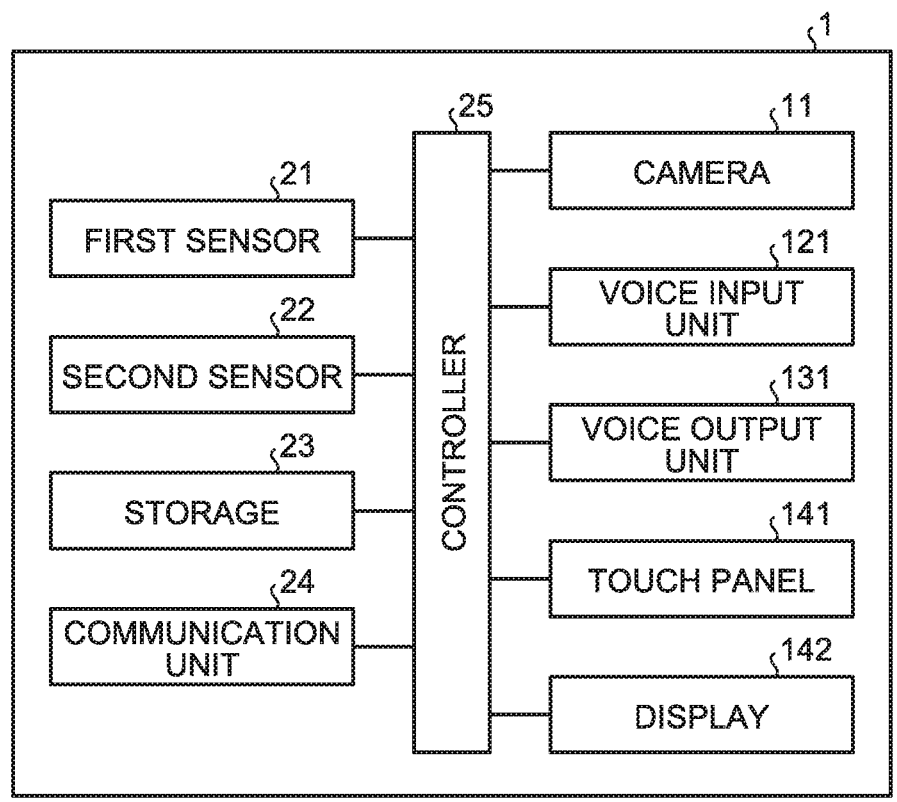
FIG. 2 is a block diagram illustrating a functional configuration of the electronic device according to the embodiments.

A functional configuration of the electronic device 1 will be described with reference to FIG. 2. FIG. 2 is a block diagram illustrating a functional configuration of the electronic device 1. As illustrated in FIG. 2, the electronic device 1 includes the camera 11, a voice input unit 121, a voice output unit 131, the touch panel 141, the display 142, a first sensor 21, a second sensor 22, a storage 23, a communication unit 24, and a controller 25.

The camera 11 converts a taken image to an electronic signal and inputs the signal to the controller 25.

The voice input unit 121 inputs a signal corresponding to an accepted voice input to the controller 25. The voice input unit 121 includes the above-described microphone 12. The voice input unit 121 may be an input interface to which an external microphone can be connected. The external microphone is connected wirelessly or with wires. Examples of the microphone connected to the input interface include, but are not limited to, a microphone provided to a headset and the like connectable to an electronic device.

The voice output unit 131 outputs a voice based on a signal accepted from the controller 25. The voice output unit 131 includes the above-described speaker 13. The voice output unit 131 may be an output interface to which an external speaker can be connected. The external speaker is connected wirelessly or with wires. Examples of the speaker connected to the output interface include, but are not limited to, a speaker provided to a headset and the like connectable to an electronic device.

The touch panel 141 inputs a signal corresponding to a detected contact operation, which has been performed using a finger or the like, to the controller 25.

The display 142 displays objects including characters, images, signs, figures, and others on the screen based on the signal accepted from the controller 25.

The first sensor 21 inputs a detection result to the controller 25. The first sensor 21 includes at least an acceleration sensor. The first sensor 21 may further include a gyro sensor, a direction sensor, and others. The acceleration sensor detects the direction and the magnitude of acceleration acting on the electronic device 1. The gyro sensor detects the angle and the angular velocity of the electronic device 1. The direction sensor detects the orientation of the earth magnetism.

The second sensor 22 inputs a detection result to the controller 25. The second sensor 22 detects the conditions around the electronic device 1. Examples of the second sensor 22 include, but are not limited to, a proximity sensor and an ambient light sensor. The proximity sensor detects the presence of a nearby object in a non-contact manner based on a change in the magnetic field and a change in the time of return of an ultrasound reflected wave. The ambient light sensor detects the amount of light incident on a light receiving element. The second sensor is not limited to these kinds of sensors as long as the sensor is capable of detecting the conditions around the electronic device 1.

The storage 23 stores therein computer codes and data. The storage 23 is further used as a workspace for temporarily storing therein a result of processing performed by the controller 25. The storage 23 may include a semiconductor storage medium and any non-transitory storage medium such as a magnetic storage medium. The storage 23 may include a variety of storage media. Furthermore, the storage 23 may include a combination of a portable memory medium such as a memory card, an optical disk, and a magneto-optical disk and a storage medium reading device. The storage 23 may include a storage device used as a transitory storage area such as a random access memory (RAM). Computer codes stored in the storage 23 include an application running in the foreground or the background and a control code supporting the operation of the application.

The storage 23 stores voice recognition dictionary data and language command processing data. The voice recognition dictionary data is data in which the characteristic pattern (the amount of characteristic) of a voice and a character string are associated with each other. The language command processing data is data in which a certain character string and certain processing executable by the controller 25 are associated with each other.

The communication unit 24 wirelessly communicates. Examples of a wireless communication standard supported by the communication unit 24 include, but are not limited to, communication standards for cellular phones of 2G, 3G, 4G, and the like and communication standards for near field radio communication. Examples of a communication standard for near field radio communication include, but are not limited to, IEEE 802.11, Bluetooth (registered trademark), the infrared data association (IrDA), the near field communication (NFC), and the wireless personal area network (WPAN). Examples of a communication standard for WPAN include, but are not limited to, ZigBee (registered trademark).

The controller 25 is a calculation processing device. Examples of the calculation processing device include, but are not limited to, a central processing unit (CPU), a system-on-a-chip (SoC), a micro control unit (MCU), a field-programmable gate array (FPGA), and a co-processor. The controller 25 implements various kinds of functions by integrally controlling operations of the electronic device 1.

The controller 25 detects whether the electronic device 1 is connected with an external device. The connection may be wired or wireless connection. Examples of a communication standard for wireless connection include Bluetooth (registered trademark). Examples of a connected external device include the above-described headset and an in-car speaker with a microphone. Examples of a communication standard for wireless connection and an external device are not limited thereto.

The controller 25 determines whether the user is looking at the display 142 (the touch screen display 14) based on a face recognition result obtained with the camera 11 taking the image or based on a detection result of the second sensor 22.

The controller 25 further determines whether the user has placed the electronic device 1 based on a detection result of the first sensor 21. Examples of a place where the user has placed the electronic device 1 include, but are not limited to, a table.

The controller 25 executes various kinds of control based on a signal input in response to a contact operation and the like detected by the touch panel 141. For example, the controller 25 makes an output corresponding to an input signal using the voice output unit 131, the display 142, and others. The controller 25 implements functions and changes settings of the electronic device 1.

The controller 25 analyzes a voice input to the voice input unit 121 and recognizes a user voice (voice recognition). In the process of voice recognition, the controller 25 reads out a character string from voice recognition dictionary data stored in the storage 23 based on the characteristic pattern (the amount of characteristic) of the input voice.

The controller 25 is capable of converting a voice input to the voice input unit 121 into text and displaying the character string read out from the voice recognition dictionary data on the display 142.

The controller 25 further detects a certain word or sentence as a voice command based on the character string read out from the voice recognition dictionary data. The controller 25 can detect certain processing corresponding to the detected certain word or sentence (the voice command) by referring to the language command processing data and execute the processing. The controller 25 is further capable of telling whether the voice input to the voice input unit 121 is a voice to be converted into text or a voice command using various known techniques.

Figure 3:
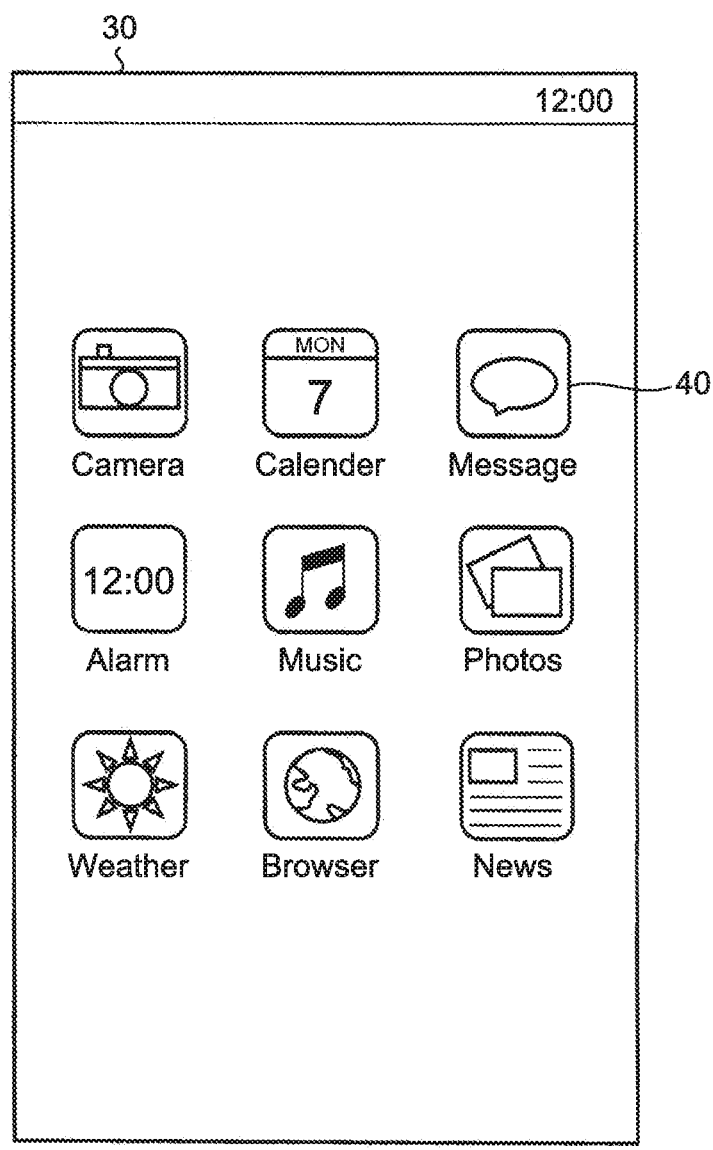
FIG. 3 is an image view of an exemplary home screen.

An exemplary screen displayed on the display 142 of the electronic device 1 will now be described with reference to FIG. 3. FIG. 3 is an exemplary home screen. A home screen 30 is displayed on the display 142. The home screen 30 is a screen on which a user can select a piece of application software (hereinafter simply referred to as an application) to run from applications installed on the electronic device 1. The electronic device 1 runs the application selected on the home screen 30 in the foreground. A screen of the application running in the foreground is displayed on the display 142.

The electronic device 1 can put an icon on the home screen 30. A plurality of icons 40 are put on the home screen 30 illustrated in FIG. 3. Each icon 40 is preliminarily associated with an application installed on the electronic device 1. Upon detection of a gesture for the icon 40, the electronic device 1 runs an application associated with the icon 40. For example, when the electronic device 1 detects tapping on the icon 40 associated with a messaging application (hereinafter referred to as a messaging app), the electronic device 1 runs the messaging app. The icon 40 includes an image and a character string. The icon 40 may include a sign or a figure instead of the image. The icon 40 may be such that either an image or a character string is not included therein. The icon 40 is arranged in accordance with a certain rule.

Figure 4A:
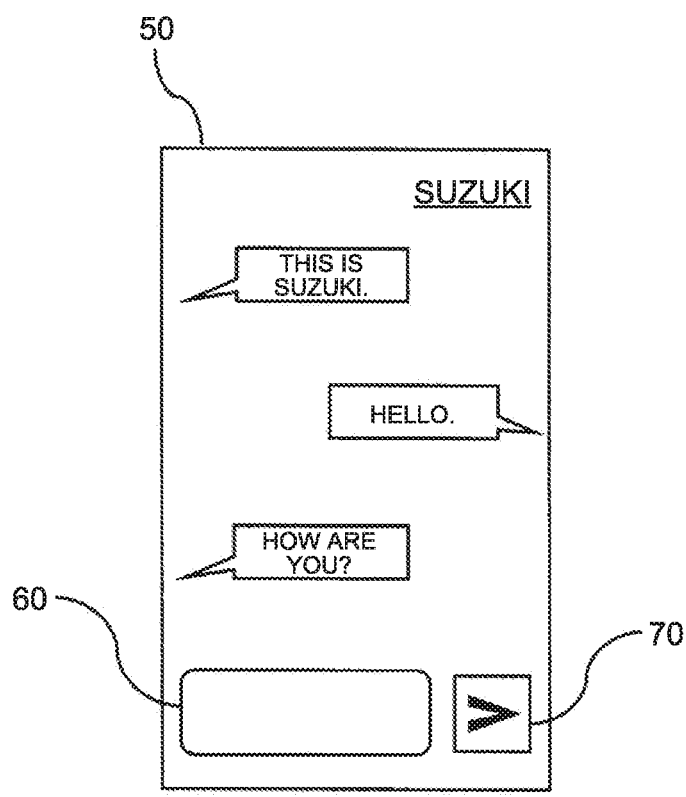
FIGS. 4A and 4B are image views of exemplary text input screens.
Figure 4B:
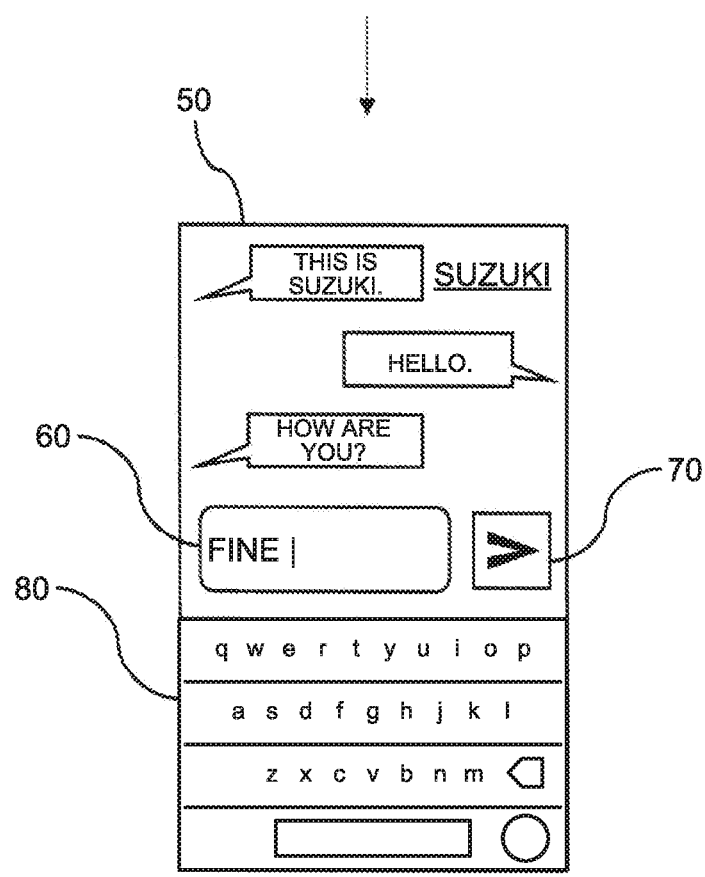

A second example of a screen displayed on the display 142 will now be described with reference to FIGS. 4A and 4B. FIGS. 4A and 4B are exemplary text input screens. The text input screen is a screen onto which the user inputs a character by operating the touch panel 141. FIGS. 4A and 4B are text input screens of a messaging app having a chatting function as one of text applications. As illustrated in FIG. 4A, a text input screen 50 displays a text input field 60 for displaying input text, a send button 70 for sending a message through a touch operation, a character string representing a person with whom messages are exchanged, and objects representing sent/received messages. With the user tapping the text input field 60, as illustrated in FIG. 4B, a software keyboard 80 is displayed on the text input screen 50. The user touches the software keyboard 80 and inputs a character to the text input field 60.

Operations of the electronic device 1 will now be described with reference to FIGS. 5, 6, and 7.

Figure 5:
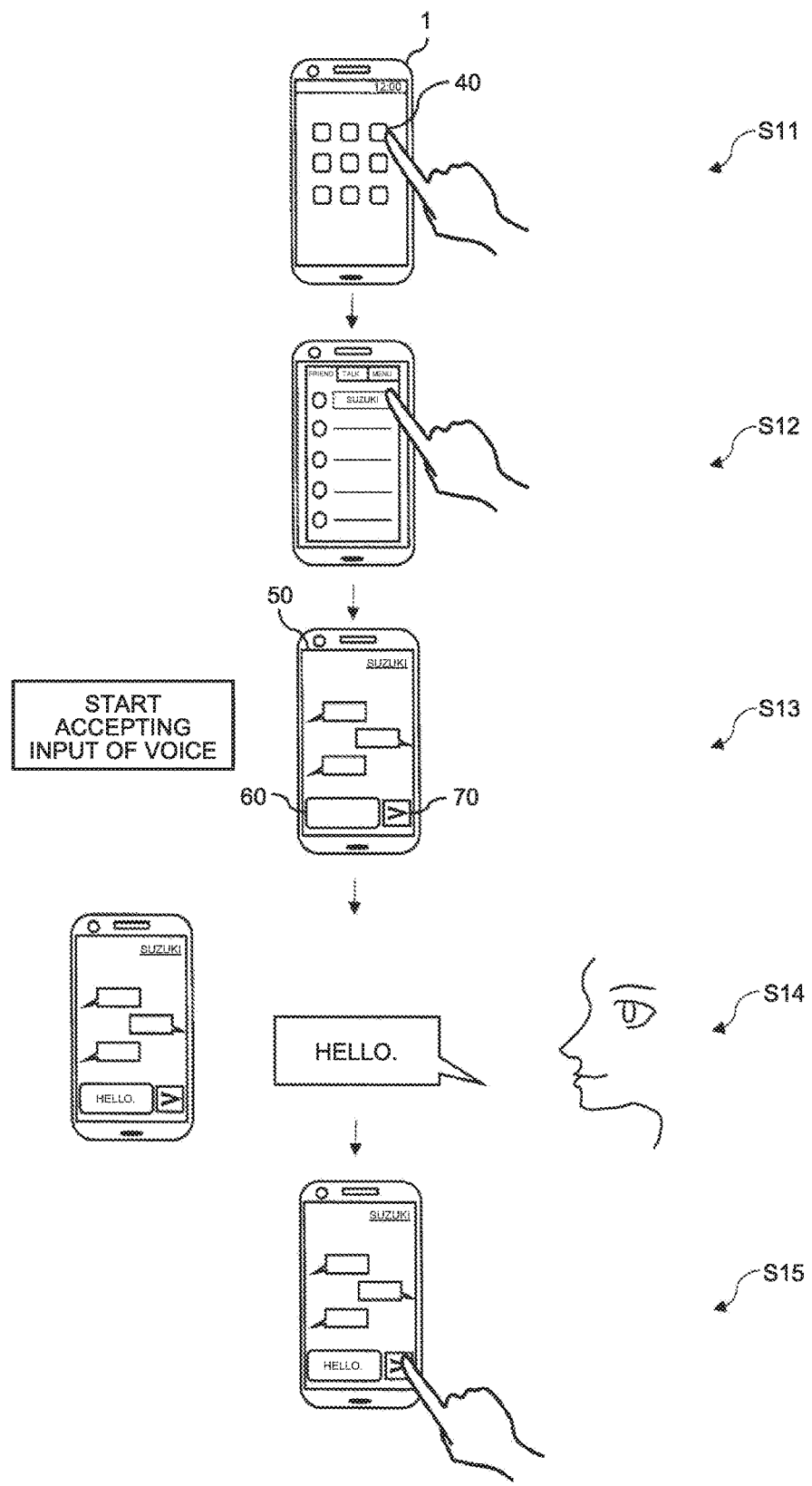
FIG. 5 is an image view of a first exemplary operation of the electronic device according to the embodiments.

FIG. 5 is an image view of a first exemplary operation of the electronic device 1. Specifically, FIG. 5 (and FIG. 6 and FIG. 7) illustrates a case in which a user operates a messaging app as one of text applications by voice. The controller 25 recognizes a user's voice input to the voice input unit 121 and performs processing corresponding to the recognized voice.

The user taps the icon 40 displayed on the touch screen display 14, activates the messaging app (Step S11), and taps a label indicative of Suzuki in an address list (Step S12).

With this operation, Suzuki is selected as an address of the message on the application. When the address is selected, the messaging app jumps to the text input screen 50, and the text input field 60 is displayed thereon (Step S13). The text input field 60 usually provides a graphical user interface (GUI) the basic operation of which is touch input. Upon display of the text input field 60, the electronic device 1 starts accepting voice inputs.

The user can input a message to be sent to Suzuki by voice. For example, when the user inputs "Hello" by voice, the voice is recognized, and characters representing "Hello" are input to the text input field 60 of the messaging app (Step S14).

The user inputs a message to be sent by voice and taps the send button 70, whereby the message is sent to Suzuki (Step S15).

Furthermore, the user may input a message to be sent to Suzuki using the touch panel 141 if the user wants to input the message with the touch panel 141. When the touch operation is performed at Step S14, accepting a voice input ends.

Figure 6:
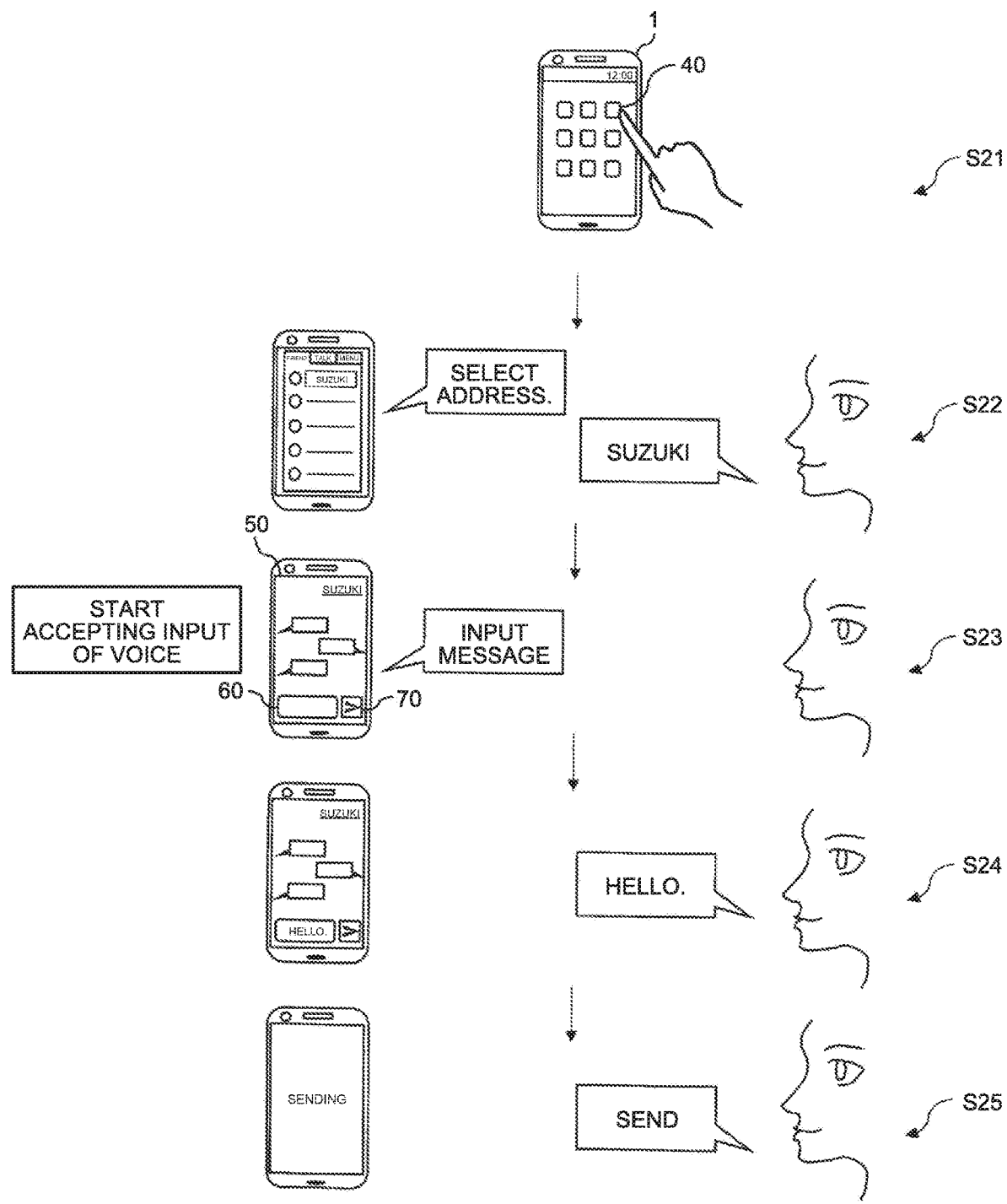
FIG. 6 is an image view of a second exemplary operation of the electronic device according to the embodiments.

FIG. 6 is an image view of a second exemplary operation of the electronic device 1. As is the case with FIG. 5, the text application is a messaging app.

When the user activates the messaging app (Step S21), the electronic device 1 outputs voice guidance saying, for example, "Select an address". The user inputs a voice command requesting, for example, "Suzuki" (Step S22).

In this manner, the voice is recognized, and Suzuki is selected as an address of the message on the application. When the address is selected, the messaging app jumps to the text input screen 50, and the text input field 60 is displayed. The electronic device 1 displays the text input field 60 and starts accepting an input of a voice. When the messaging app jumps to the text input screen 50 and the text input field 60 is displayed, the electronic device 1 outputs voice guidance saying, for example, "Input a message" (Step S23).

The user can input a message to be sent to Suzuki by voice. For example, when the user inputs a voice saying "Hello", the voice is recognized, and characters representing "Hello" are input to the text input field 60 of the messaging app (Step S24).

The user inputs a message to be sent by voice and then makes a voice command by inputting a voice command requesting, for example, "Send". The voice is recognized, and the massage is sent to Suzuki (Step S25).

Figure 7:
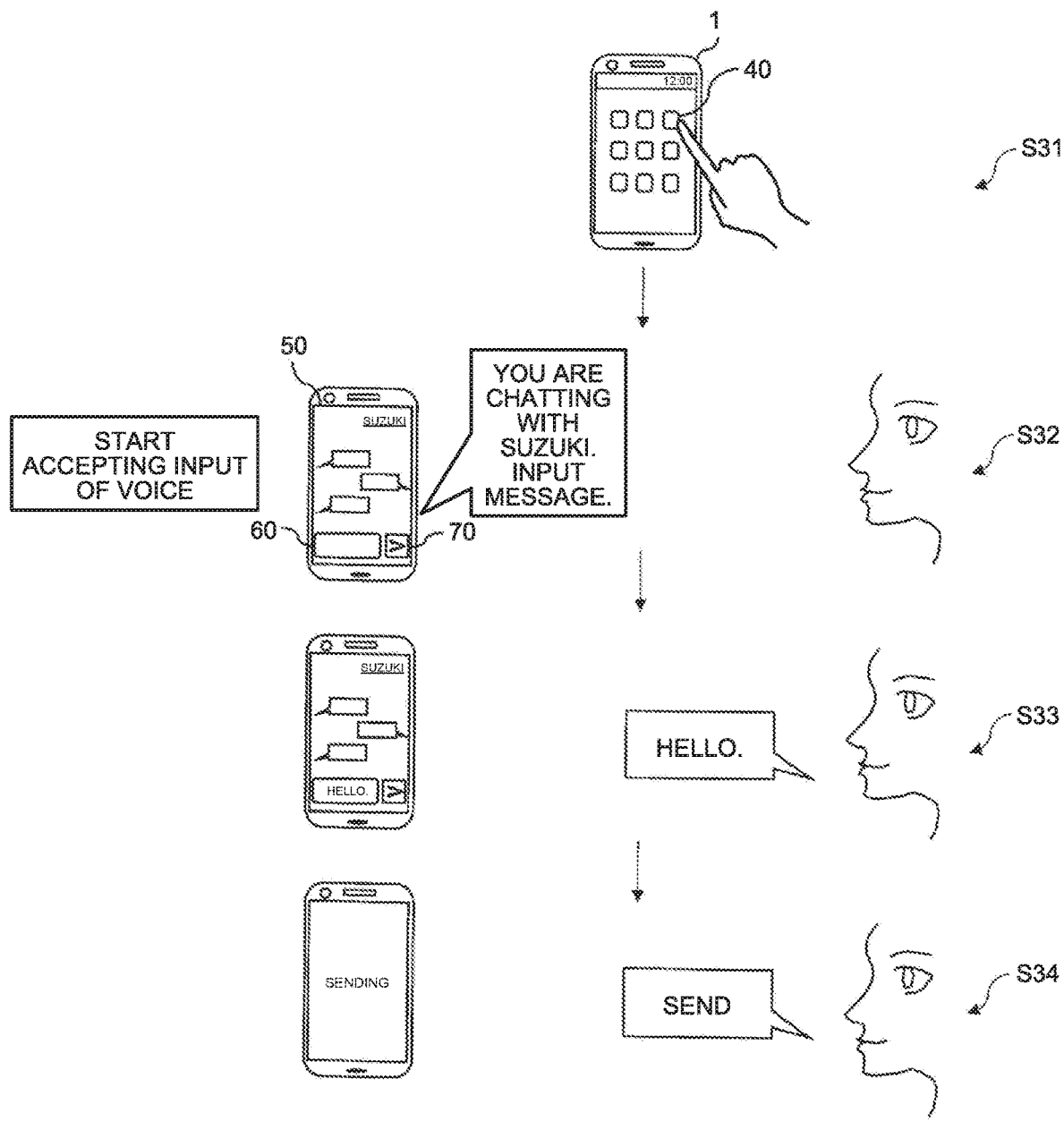
FIG. 7 is an image view of a third exemplary operation of the electronic device according to the embodiments.

FIG. 7 is an image view of a third exemplary operation of the electronic device 1. As is the case with FIGS. 5 and 6, the text application is a messaging app. In the example of FIG. 7, the messaging app is already running in the background when the user activates the messaging app. In this case, when the user activates the application, the application is transferred from the background to the foreground. When the messaging app is transferred from the background to the foreground, as illustrated in FIG. 7, the text input field 60 is likely to be displayed on the screen immediately after the activation. In the example of FIG. 7, the electronic device 1 starts accepting an input of a voice at the timing of transfer of the application from the background to the foreground.

In this case, as illustrated in FIG. 7, when the user activates the messaging app (Step S31), the electronic device 1 outputs voice guidance saying, for example, "You are chatting with Suzuki. Input a message." (Step S32).

When the electronic device 1 outputs this voice, the user can input a message to be sent to Suzuki by voice. For example, when the user inputs a voice saying "Hello", the voice is recognized, and characters representing "Hello" are input to the text input field 60 of the messaging app (Step S33).

Furthermore, after inputting a message to be sent by voice, the user makes a voice command by inputting a voice command requesting, for example, "Send". The voice is recognized, and the massage is sent to Suzuki (Step S34).

Other operations of the electronic device 1 will now be described with reference to FIGS. 8 and 9.

Figure 8:
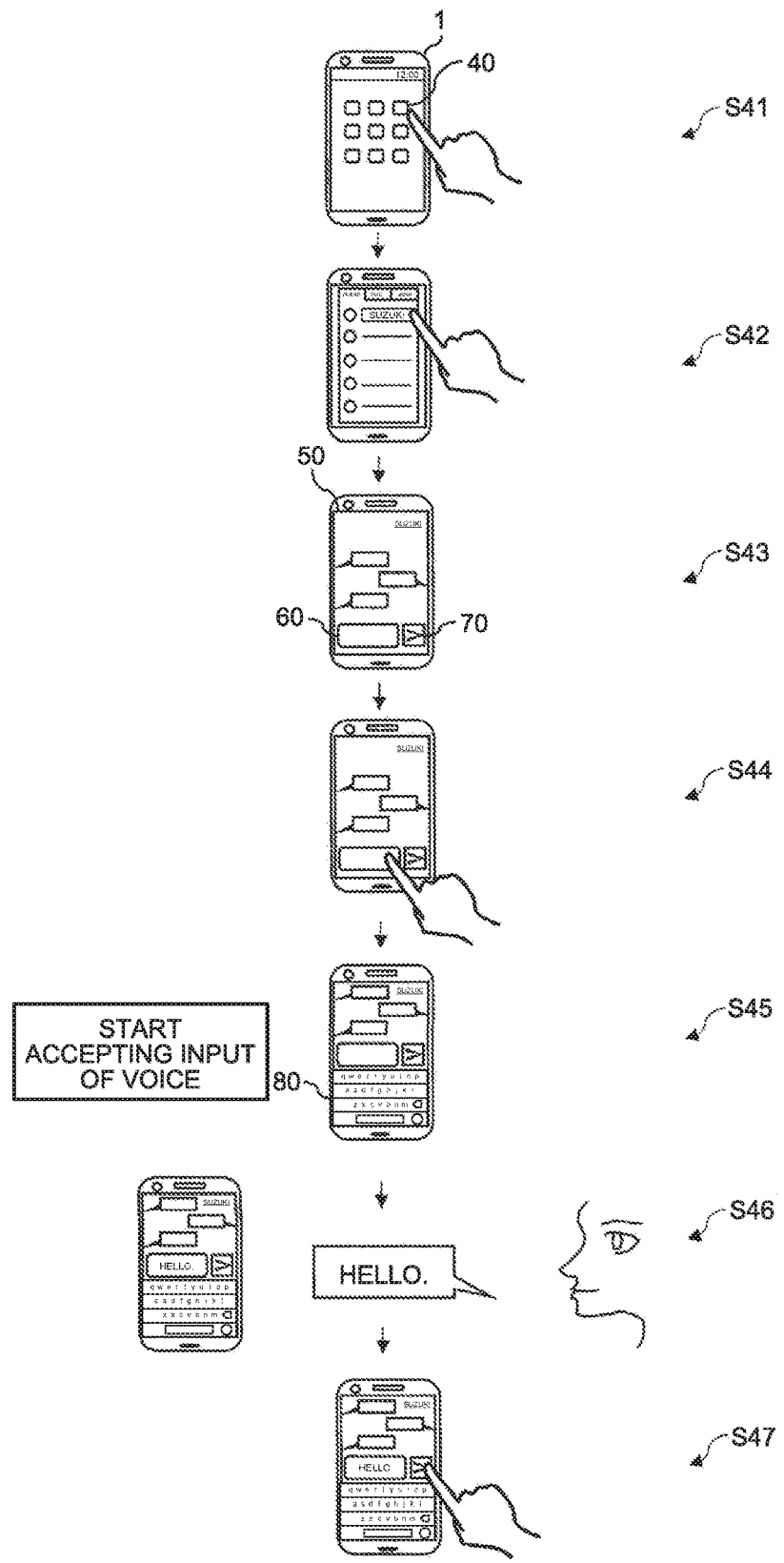
FIG. 8 is an image view of a fourth exemplary operation of the electronic device according to the embodiments.

FIG. 8 is an image view of a fourth exemplary operation of the electronic device 1. As is the case with FIGS. 5, 6, and 7, FIG. 8 (and FIG. 9) illustrates a case in which a user operates a messaging app by voice.

The user taps the icon 40 displayed on the touch screen display 14, activates the messaging app (Step S41), and taps a label indicative of Suzuki in the address list (Step S42).

With this operation, Suzuki is selected as an address of the message on the application. When the address is selected, the messaging app jumps to the text input screen 50 (Step S43).

The user taps the text input field 60 displayed on the touch screen display 14 (Step S44), and the software keyboard 80 is displayed (Step S45). The electronic device 1 displays the software keyboard 80 and starts accepting an input of a voice.

The user can input a message to be sent to Suzuki by voice. For example, when the user inputs "Hello" by voice, the voice is recognized, and characters representing "Hello" are input to the text input field 60 of the messaging app (Step S46).

The user inputs a message to be sent by voice and taps the send button 70, whereby the message is sent to Suzuki (Step S47).

Furthermore, the user may input a message to be sent to Suzuki using the touch panel 141 if the user wants to input the message with the touch panel 141. When the touch operation is performed at Step S47, accepting a voice input ends.

Figure 9:
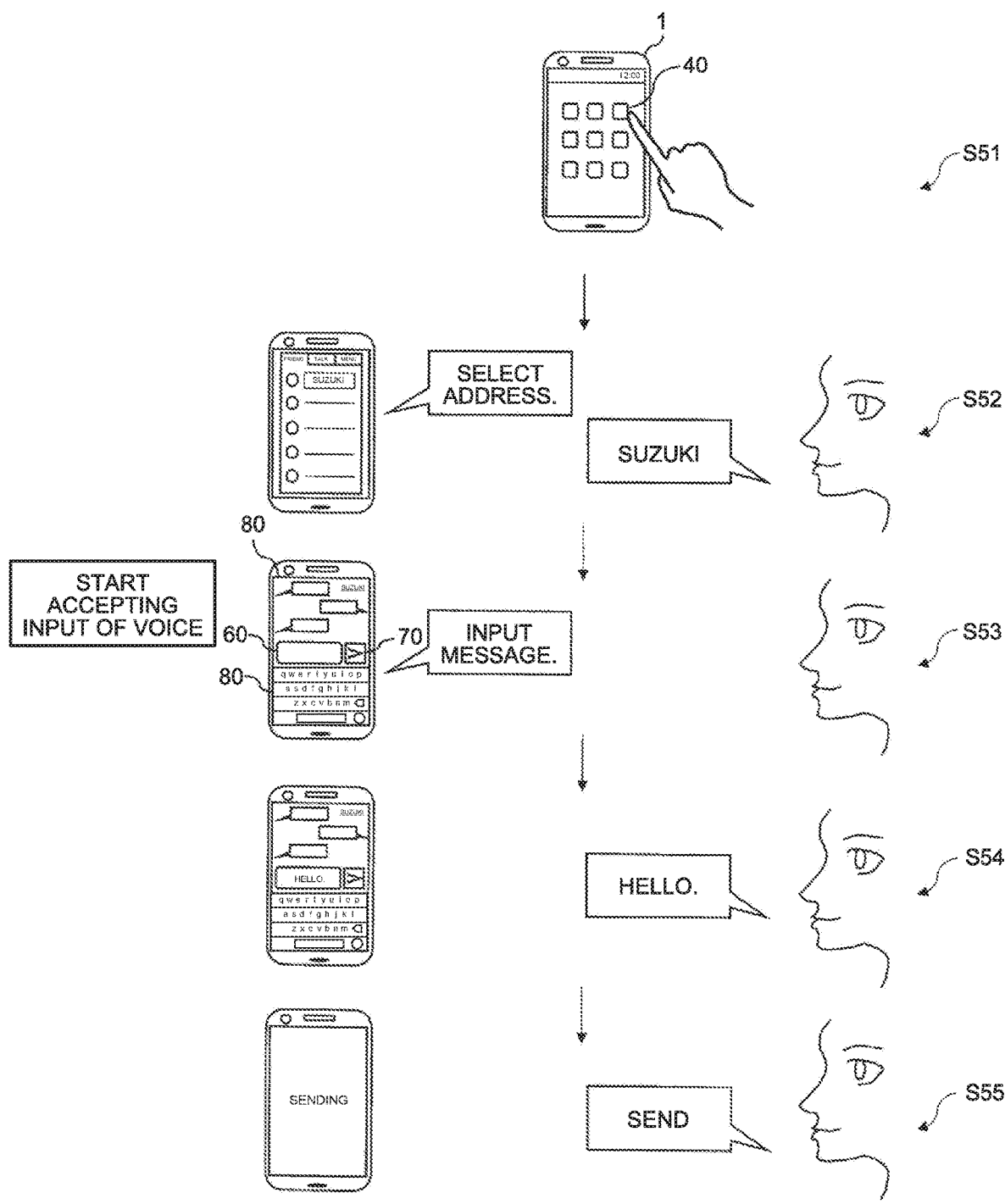
FIG. 9 is an image view of a fifth exemplary operation of the electronic device according to the embodiments.

FIG. 9 is an image view of a fifth exemplary operation of the electronic device 1.

When the user activates the messaging app (Step S51), the electronic device 1 outputs a voice guidance saying, for example, "Select an address". The user inputs a voice command requesting, for example, "Suzuki" (Step S52).

In this manner, the voice is recognized, and Suzuki is selected as an address of the message on the application. When the address is selected, the messaging app jumps to the text input screen 50, and the software keyboard 80 is displayed on the screen. The electronic device 1 displays the software keyboard 80 and starts accepting an input of a voice. When the messaging app jumps to the text input screen 50 and the software keyboard 80 is accordingly displayed on the screen, the electronic device 1 outputs a voice guidance saying, for example, "Input a message" (Step S53).

The user can input a message to be sent to Suzuki by voice. For example, when the user inputs a voice saying "Hello", the voice is recognized, and characters representing "Hello" are input to the text input field 60 of the messaging app (Step S54).

The user inputs a message to be sent by voice and then makes a voice command by inputting a voice command requesting, for example, "Send". The voice is recognized, and the massage is sent to Suzuki (Step S55).

In FIGS. 5 to 9, the text application has been described as a messaging app; however, the embodiments are not limited thereto. Examples of the text application may include, but are not limited to, a social networking service (SNS) app, a mailing app, and a memo app.

Controls provided by the electronic device 1 will now be described with reference to FIGS. 10 and 11.

Figure 10:
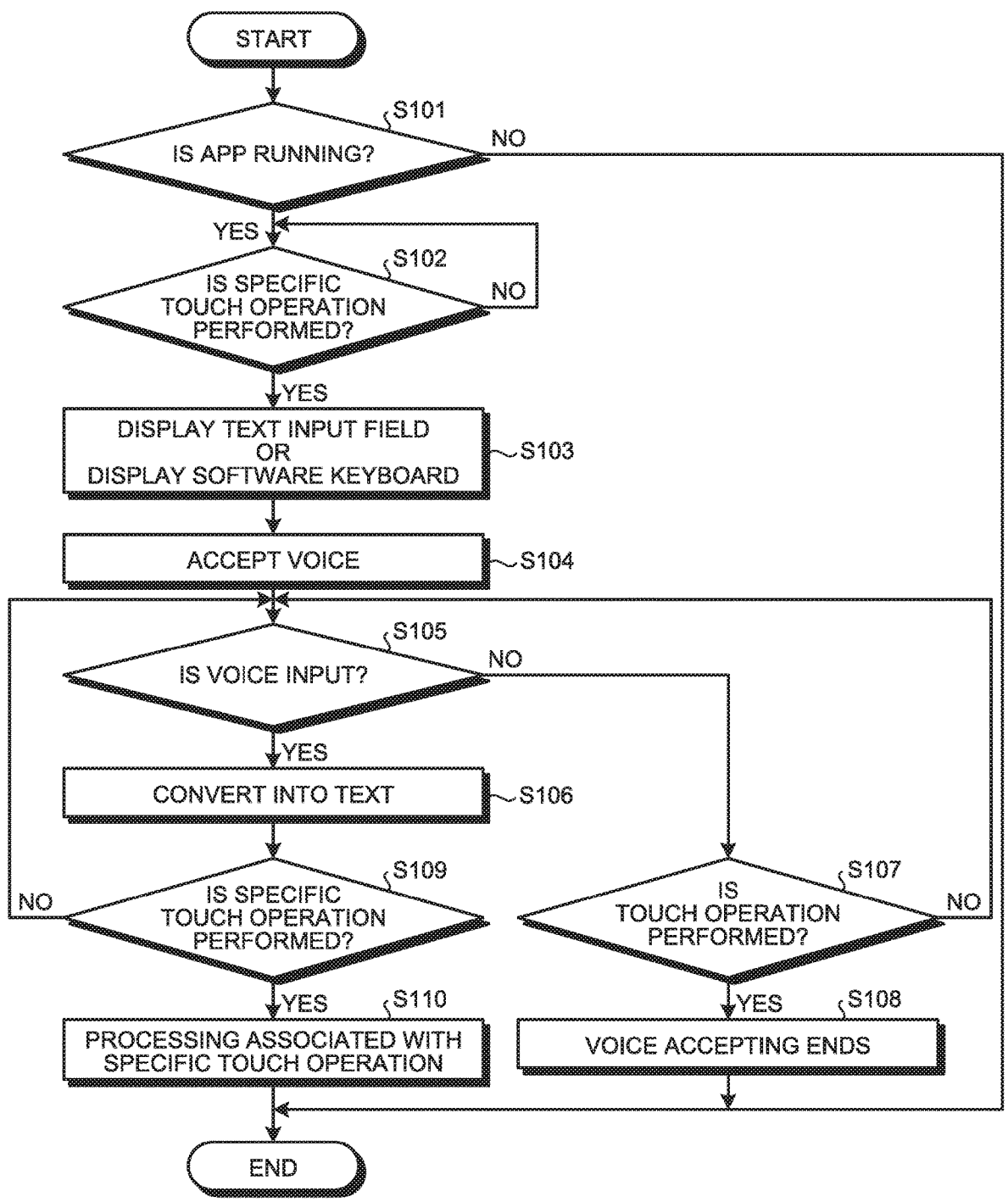
FIG. 10 is a flowchart illustrating a first exemplary control performed by the electronic device according to the embodiments.

FIG. 10 is a flowchart illustrating a first exemplary control provided by the electronic device 1. The control of the electronic device 1 in FIG. 10 corresponds to the operation of the electronic device 1 in FIG. 5 and the operation of the electronic device 1 in FIG. 8.

The controller 25 determines whether a text application runs (Step S101). If it is determined that no text application runs (No at Step S101), then the controller 25 ends the processing. If it is determined that a text application runs (Yes at Step S101), then the controller 25 determines whether the user has performed a specific touch operation (Step S102).

If it is determined that the user has performed a specific touch operation (Yes at Step S102), the text application jumps to a screen with a text input field on which the user can perform a touch operation or a software keyboard displayed (Step S103). If it is determined that the user has performed no specific touch operation (No at Step S102), then the controller 25 repeats the processing of Step S102.

When the text application jumps to the screen with the text input field or the software keyboard displayed, the controller 25 accepts an input of a voice (Step S104). In the subsequent processing flow, input voices are converted into texts and input to the text input field. In other words, if voices are input to the voice input unit 121, the controller 25 inputs texts corresponding to the voices to the text input field.

The controller 25 subsequently determines whether the user has input a voice (Step S105). If it is determined that the user has input a voice (Yes at Step S105), then the controller 25 converts the recognized voice into text and inputs the text to the text input field (Step S106). If it is determined that the user has input no voice (No at Step S105), then the controller 25 determines whether the user has performed an operation on the touch panel 141 (Step S107). In this case, the voice is a voice of "Hello" at Step S14 in FIG. 5 and a voice of "Hello" at Step S46 in FIG. 8.

If it is determined that the user has performed no operation on the touch panel 141 (No at Step S107), the controller 25 returns the processing to Step S105. If it is determined that the user has performed an operation on the touch panel 141 (Yes at Step S107), then the controller 25 stops accepting voices (Step S108) and ends the processing.

The controller 25 converts the recognized voice into text, inputs the text to the text input field, and determines whether the user has performed a specific touch operation (Step S109). If it is determined that the user has performed no specific touch operation (No at Step S109), then the controller 25 returns the processing to Step S105. If it is determined that the user has performed a specific touch operation (Yes at Step S109), then the controller 25 performs processing associated with the specific touch operation (Step S110) and ends the processing. In this case, the specific touch operation is to tap the send button 70 at Step S15 in FIG. 5 and to tap the send button 70 at Step S47 in FIG. 8. The processing associated with the specific touch operation is to send a message in FIG. 5 and FIG. 8.

The processing of "determining whether the text application runs" at Step S101 in FIG. 10 may be replaced by processing of "determining whether the text application runs with the electronic device 1 connected with an external device". This process is advantageous in reducing the power consumption of the electronic device 1 and in reducing the possibility of misrecognition of a voice. This processing is carried out at Step S12 in FIG. 5 and at Step S42 in FIG. 8.

Similarly, the processing of "determining whether the text application runs" at Step S101 in FIG. 10 may be replaced by processing of "determining whether the text application runs with the user not looking at the display 142". This configuration can reduce the power consumption of the electronic device 1 and reduce the possibility of misrecognition of a voice. This processing is carried out at Step S12 in FIG. 5 and at Step S42 in FIG. 8.

In FIG. 10, Step S101 may be followed by Step S102. For example, as described in the exemplary messaging app of FIG. 7, when the user activates the text application, the application is transferred from the background to the foreground. In this case, the text application jumps to a screen with the text input field displayed or a screen with a software keyboard displayed immediately after the activation. Some text applications may be designed such that a text input field is displayed on the screen first displayed after the activation. Likewise, some text applications may be designed such that a software keyboard is displayed on the screen first displayed after the activation.

Step S103 in FIG. 10 may be followed by processing of "determining whether the user has placed the electronic device 1". This configuration can reduce the power consumption of the electronic device 1 and reduce the possibility of misrecognition of a voice. This processing is carried out at Step S13 in FIG. 5 and at Step S45 in FIG. 8.

At Step S106 in FIG. 10, when text is input by a voice, the text may be output from the electronic device 1 by voice. This configuration can prevent a message that is not intended by the user from being sent as it is. This processing is carried out at Step S14 in FIG. 5 and at Step S46 in FIG. 8.

Moreover, the processing of "determining whether an operation has been performed on the touch panel 141" at Step S107 in FIG. 10 may be replaced by processing of "determining whether a touch panel operation other than a touch panel operation for inputting characters has been performed on the touch panel 141".

If Step S103 represents processing of "displaying a text input field", the specific touch operation at Step S102 corresponds to the operation of selecting an address by touching the touch panel 141 at Step S12 in FIG. 5. If Step S103 represents processing of "displaying a software keyboard", the specific touch operation at Step S102 corresponds to the operation of tapping the text input field at Step S44 in FIG. 8.

Figure 11:
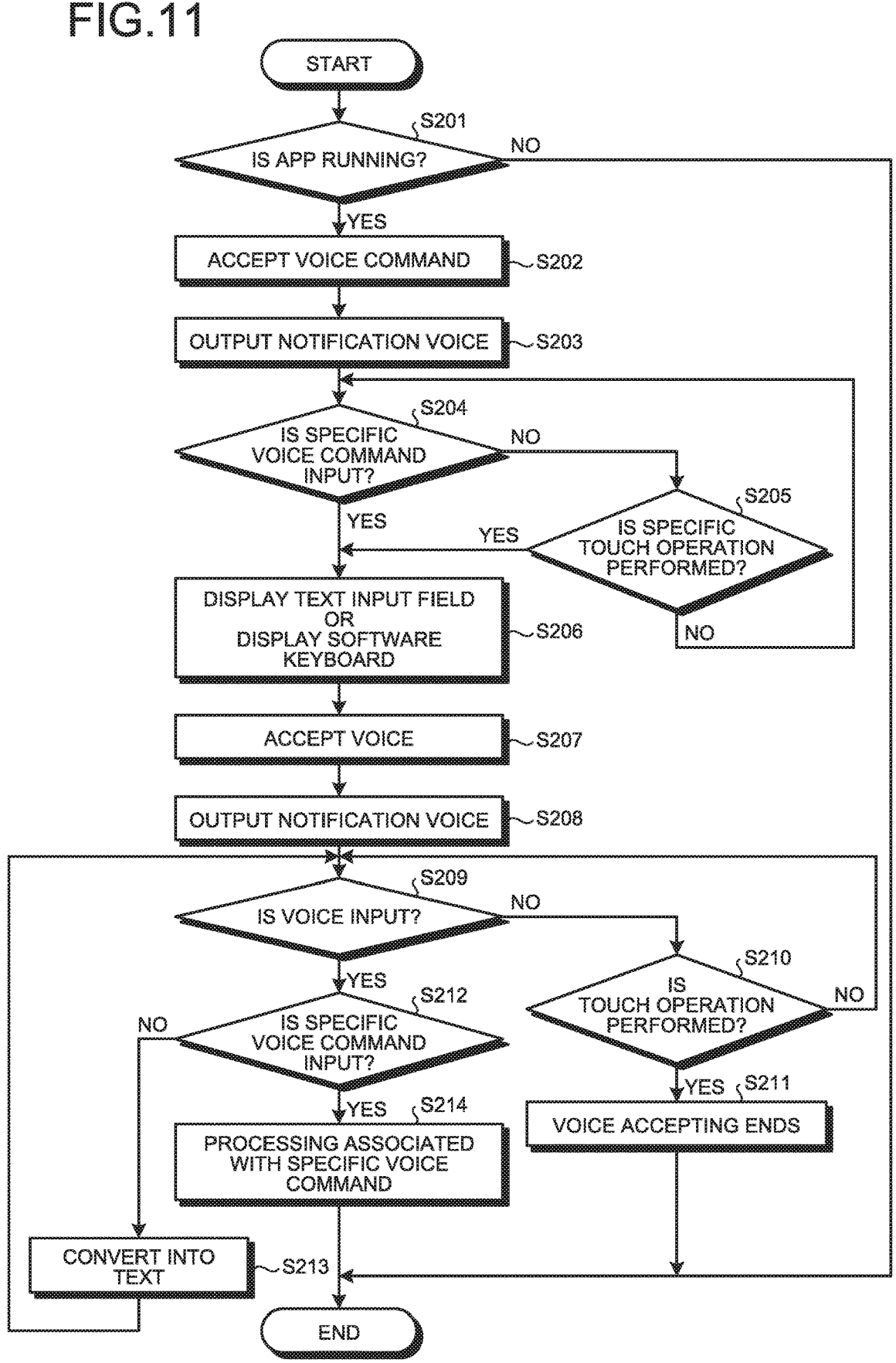
FIG. 11 is a flowchart illustrating a second exemplary control performed by the electronic device according to the embodiments.

FIG. 11 is a flowchart illustrating a second exemplary control performed by the electronic device 1. The control of the electronic device 1 in FIG. 11 corresponds to the operation of the electronic device 1 in FIG. 6 and the operation of the electronic device 1 in FIG. 9.

The controller 25 determines whether the text application runs (Step S201). If it is determined that no text application runs (No at Step S201), the controller 25 ends the processing. If it is determined that a text application runs (Yes at Step S201), then the controller 25 accepts an input of a specific voice command (Step S202).

The voice output unit 131 outputs a voice notifying the user of a start of accepting an input of a specific voice command (Step S203).

The controller 25 subsequently determines whether the user has input a specific voice command (Step S204). If it is determined that the user has input the specific voice command (Yes at Step S204), the text application jumps to a screen with a text input field or a software keyboard displayed (Step S206). If it is determined that the user has input no specific voice command (No at Step S204), then the controller 25 determines whether the user has performed a specific touch operation (Step S205). In this case, the specific voice command is a voice saying "Suzuki" at Step S22 in FIG. 6 and a voice saying "Suzuki" at Step S52 in FIG. 9.

If it is determined that the user has performed no specific touch operation (No at Step S205), the controller 25 returns the processing to Step S204. If it is determined that the user has performed a specific touch operation (Yes at Step S205), the text application jumps to a screen with a text input field or a software keyboard displayed (Step S206).

When the text application jumps to the screen with the text input field or the software keyboard displayed, the controller 25 accepts an input of a specific voice command and also accepts a voice input (Step S207). In the subsequent processing flow, input voices are converted into texts and input to the text input field. In other words, if voices are input to the voice input unit 121, the controller 25 inputs texts corresponding to the voices to the text input field.

The voice output unit 131 outputs a voice notifying the user of a start of accepting an input of a voice (Step S208).

The controller 25 determines whether the user has input a voice (Step S209). If it is determined that the user has input a voice (Yes at Step S209), then the controller 25 determines whether the user has subsequently input a voice command (Step S212). If it is determined that the user has input no voice command (No at Step S209), then the controller 25 determines whether the user has performed an operation on the touch panel 141 (Step S210). The voice is a voice of "Hello" at Step S24 in FIG. 6 and also a voice of "Hello" at Step S54 in FIG. 9. The voice command is a voice of "Send" at Step S25 in FIG. 6 and also a voice of "Send" at Step S55 in FIG. 9.

If it is determined that the user has performed no operation on the touch panel 141 (No at Step S210), the controller 25 returns the processing to Step S209. If it is determined that the user has performed an operation on the touch panel 141 (Yes at Step S210), the controller 25 stops accepting voices (Step S211) and ends the processing.

As a result of determining whether the voice command has been input, if it is determined that no voice command has been accepted from the user (No at Step S212), then the controller 25 converts the recognized voice into text and inputs the text to the text input field (Step S213) and returns the processing to Step S209. If it is determined that the user has input a voice command (Yes at Step S212), then the controller 25 performs processing associated with the voice command (Step S214) and ends the processing. The processing associated with the voice command is to send a message in FIG. 6 and FIG. 9.

The specific voice command at Step S204 is a part of the specific voice command at Step S202. The specific voice command is not limited to a voice command for displaying the text input field or the software keyboard and is able to carry out various kinds of control. For example, with the messaging app illustrated in FIGS. 6 and 9, the user may have the electronic device 1 jump to a menu screen by inputting a voice saying "Menu".

The specific voice command (a voice saying "Suzuki" at Step S22 in FIG. 6 and at Step S52 in FIG. 9) is a voice command for displaying the text input field. Upon accepting an input of the voice command, the controller 25 causes the text input field to be displayed. This eliminates a touch operation that causes the text input field to be displayed to start a character input by voice. As a result, operability of the electronic device 1 will improve.

In "determining whether the user has input a voice command" after "determining whether the user has input a voice" at Step S214 in FIG. 11, whether the input voice is a voice command is determined based on whether a state of no voice inputs has continued for a certain period before and after the word or sentence input. In other words, when the controller 25 recognizes a voice (a certain word or sentence) having the same sound as that of the voice command and confirms an input of a voice continued before and after the recognized voice, the controller 25 recognizes that the voice is a voice to be converted into text and converts the voice into text. On the other hand, for example, if a state of no voice input has continued for a certain period before recognition of a certain word or sentence and if a state of no voice input has continued for a certain period after the recognition, the controller 25 determines that an input of a voice has been completed before the input of the certain word or sentence, recognizes the certain word or sentence as a voice command, and performs processing associated with the voice command. Examples of the certain time include, but are not limited to, one second. This eliminates an operation that serves as a trigger for distinguishing a voice to be converted into text from a voice command. As a result, operability of the electronic device 1 will improve. The method for causing the controller 25 to determine that an input of a voice has been completed is not however limited to this method. For example, a voice to be converted into text and a voice command may be distinguished from each other by allocating a linguistically meaningless character string to a certain word or sentence serving as a voice command or by determining a threshold based on, for example, the speed of a voice input, and the volume, the pitch, the tone, and the other parameters of the input voice.

The processing of "determining whether the text application runs" at Step S201 in FIG. 11 may be replaced by processing of "determining whether the text application runs with the electronic device 1 connected with an external device". This configuration can reduce the power consumption of the electronic device 1 and reduce the possibility of misrecognition of a voice. This processing is carried out at Step S22 in FIG. 6 and at Step S52 in FIG. 9.

Similarly, the processing of "determining whether the text application runs" at Step S201 in FIG. 11 may be replaced by processing of "determining whether the text application runs with the user not looking at the display 142". This configuration can reduce the power consumption of the electronic device 1 and reduce the possibility of misrecognition of a voice. This processing is carried out at Step S22 in FIG. 6 and at Step S52 in FIG. 9.

In FIG. 11, Step S201 may be followed by Step S206. In this case, the control of the electronic device 1 in FIG. 11 corresponds to the operation of the electronic device 1 in FIG. 7. The text application jumps to a screen with the text input field or a software keyboard displayed immediately after the activation. Some text applications can be designed such that a text input field is displayed on the screen first displayed after the activation. Likewise, some text applications can be designed such that a software keyboard is displayed on the screen first displayed after the activation.

Step S206 in FIG. 11 may be followed by additional processing of "determining whether the user has placed the electronic device 1". This configuration can reduce the power consumption of the electronic device 1 and reduce the possibility of misrecognition of a voice. This processing is carried out at Step S23 in FIG. 6 and at Step S53 in FIG. 9.

At Step S213 in FIG. 11, when a text is input using a voice, the text may be output from the electronic device 1 by voice. This configuration can prevent a message that is not intended by the user from being sent as it is. This processing is carried out at Step S24 in FIG. 6 and at Step S54 in FIG. 9.

The processing of "determining whether an operation has been performed on the touch panel 141" at Step S210 in FIG. 11 may be replaced by processing of "determining whether a touch panel operation other than a touch panel operation for inputting characters has been performed on the touch panel 141".

If Step S206 represents processing of "displaying a text input field", the specific touch operation at Step S205 corresponds to, for example, an operation of selecting an address by touching the touch panel 141 in the process of Step S22 in FIG. 6. If Step S206 represents processing of "displaying a software keyboard", the specific touch operation at Step S205 corresponds to, for example, an operation of tapping the text input field in the process of Step S52 in FIG. 9.

In the embodiments in the image view of FIG. 6 and the corresponding flowchart in FIG. 11, the electronic device 1 outputs voices for encouraging the user to start a voice input that respectively correspond to a screen with a text input field displayed and a screen with no text input field displayed. This configuration allows the user to easily recognize the status in which the electronic device 1 is accepting a voice input.

In the embodiments in the image view of FIG. 9 and the corresponding flowchart in FIG. 11, the electronic device 1 outputs voices for encouraging the user to start a voice input that respectively correspond to a screen with a software keyboard displayed and a screen with no software keyboard displayed. This configuration allows the user to easily recognize the status in which the electronic device 1 is accepting a voice input.

In the above-described embodiments, if a user performs a touch panel operation while a text input field is displayed on the text application (the messaging app) and the controller 25 is accepting an input of a voice, the controller 25 terminates accepting an input of a voice and returns to a control state before activation of the text application in which no voice input is accepted. This configuration can reduce the power consumption and reduce the possibility of misrecognition.

In the above-described embodiments, while a text application (a messaging app) runs that requires a character input operation of a user, if a text input field is displayed on the text application, the controller 25 accepts an input of a voice. When the voice is input to the voice input unit 121, the controller 25 inputs a text corresponding to the voice to the text input field of the text application. This method allows the user to input characters by voice and eliminates an operation that serves as a trigger for starting a character input by voice. As a result, operability of the electronic device 1 will improve.

In the above-described embodiments, if a text application (a messaging app) runs with no text input field displayed, the controller 25 accepts an input of a specific voice command. When the specific voice command is input, the controller 25 performs processing associated with the specific voice command. This method allows the user to operate the text application by voice even when the user performs no text input operation. As a result, operability will improve.

In the above-described embodiments, if a user performs a touch panel operation while a software keyboard is displayed on the text application (the messaging app) and the controller 25 is accepting an input of a voice, the controller 25 terminates accepting an input of a voice and returns to a control state before activation of the text application that accepts no voice input. This configuration can reduce the power consumption and reduce the possibility of misrecognition.

In the above-described embodiments, while a text application (a messaging app) runs that requires a character input operation of a user, if a software keyboard is displayed on the text application, the controller 25 accepts an input of a voice. When the voice is input to the voice input unit 121, the controller 25 inputs a text corresponding to the voice to the text input field of the text application. This method allows the user to input characters by voice and eliminates an operation that serves as a trigger for starting a character input by voice. As a result, operability of the electronic device 1 will improve.

In the above-described embodiments, if a text application (a messaging app) runs with no software keyboard displayed, the controller 25 accepts an input of a specific voice command. When the specific voice command is input, the controller 25 performs processing associated with the specific voice command. This method allows the user to operate the text application by voice even when the user performs no text input operation. As a result, operability will improve.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An electronic device, comprising:
 a microphone;
 a display;
 a touch panel; and
 a controller, wherein the controller is configured to start accepting, through the microphone, a specific voice command input,
during said accepting specific voice command input, the controller is configured to
 determine whether a predetermined word corresponding to a specific voice command is inputted,
 upon a determination that the specific voice command is inputted, cause the display to display a text input field and a software keyboard on which a touch operation is performable,
 upon a determination that the specific voice command is not inputted, determine whether a specific touch operation is performed on the display, and
 upon a determination that the specific touch operation is performed on the display, cause the display to display the text input field and the software keyboard, and
the controller is configured to start accepting voice input in response to the text input field and the software keyboard being displayed on the display, wherein said accepting voice input comprises:
 converting voice inputted through the microphone into text, and
 inputting the converted text into the text input field, and
during said accepting voice input, when the predetermined word corresponding to the specific voice command is recognized, the controller is configured to
 determine whether voice is inputted through the microphone during two intervals of a predetermined duration before and after the predetermined word, respectively,
 upon a determination that no voice is inputted through the microphone during both of the two intervals,
  accept the predetermined word as an input of the specific voice command, and
  perform processing associated with the specific voice command, and
 upon a determination that voice is inputted through the microphone during any of the two intervals,
  recognize the predetermined word as voice to be converted to text,
  convert the predetermined word into text, and
  input the text converted from the predetermined word into the text input field, and
during said accepting voice input and displaying the text input field and the software keyboard,
 upon a determination that the touch operation is performed, the controller is configured to terminate said accepting voice input.

2. The electronic device according to claim 1, wherein the controller is configured
 to start accepting voice command in response to no text input field being displayed, and
 to perform processing associated with a voice command being input to the microphone.

3. The electronic device according to claim 2, wherein the controller is configured to cause the display to display the text input field in response to a voice command for displaying the text input field being input to the microphone.

4. The electronic device according to claim 2, further comprising:
 a speaker, wherein
 the speaker is configured to
  when no text input field is displayed, output a first voice notification notifying a user of a start of said accepting voice command, and when the text input field and the software keyboard are displayed, output a second voice notification notifying the user of a start of said accepting voice input.

5. The electronic device according to claim 2, wherein
the controller is configured to detect whether the electronic device is connected with an external device, and
the controller is configured, in response to the electronic device being connected to the external device,
to perform said accepting voice input in response to the text input field being displayed, and
to perform said accepting voice command in response to no text input field being displayed.

6. The electronic device according to claim 2, wherein
the controller is configured to determine whether a user is looking at the display, and
the controller is configured, in response to determining that the user is not looking at the display,
to perform said accepting voice input in response to the text input field being displayed, and
to perform said accepting voice command in response to no text input field being displayed.

7. The electronic device according to claim 1, wherein
the controller is configured to determine a predetermined position of the electronic device, and
the controller is configured, in response to determining the predetermined position of the electronic device, to perform said accepting voice input in response to the text input field being displayed.

8. The electronic device according to claim 1, wherein the controller is configured to terminate said accepting voice input, in response to the specific touch operation performed on the touch panel while the controller is performing said accepting voice input.

9. The electronic device according to claim 1, further comprising:
a speaker, wherein
the speaker is configured to audibly output the converted text, in response to the converted text being input to the text input field.

10. The electronic device according to claim 1, wherein the specific touch operation includes an operation of selecting an address by touching the display.

11. A control method of an electronic device that includes a microphone, a display, a touch panel, and a controller, the control method comprising:
starting accepting, through the microphone, a specific voice command input;
during said accepting specific voice command input,
determining whether a predetermined word corresponding to a specific voice command is inputted,
upon a determination that the specific voice command is inputted, causing the display to display (i) a text input field on which a touch operation is performable and (ii) a software keyboard,
upon a determination that the specific voice command is not inputted, determining whether a specific touch operation is performed on the display, and
upon a determination that the specific touch operation is performed on the display, causing the display to display the text input field and the software keyboard;
in response to the text input field and the software keyboard being displayed on the display, starting accepting voice input, wherein said accepting voice input comprises:
converting voice inputted through the microphone into text, and
inputting the converted text into the text input field; and
during said accepting voice input, when the predetermined word corresponding to the specific voice command is recognized,
determining whether voice is inputted through the microphone during two intervals of a predetermined duration before and after the predetermined word, respectively,
upon a determination that no voice is inputted through the microphone during both of the two intervals,
accepting the predetermined word as an input of the specific voice command, and
performing processing associated with the specific voice command, and
upon a determination that voice is inputted through the microphone during any of the two intervals,
recognizing the predetermined word as voice to be converted to text,
converting the predetermined word into text, and
inputting the text converted from the predetermined word into the text input field
during said accepting voice input and displaying the text input field and the software keyboard,
upon a determination that the touch operation is performed, terminating said accepting voice input.

12. An electronic device, comprising:
a microphone;
a display;
a touch panel; and
a controller, wherein
the controller is configured to start accepting, through the microphone, a specific voice command input,
during said accepting specific voice command input, the controller is configured to
determine whether a predetermined word corresponding to a specific voice command is inputted,
upon a determination that the specific voice command is inputted, start accepting voice input and cause the display to display a text input field and a software keyboard on which a touch operation is performable,
upon a determination that the specific voice command is not inputted, determine whether a specific touch operation is performed on the display, and
upon a determination that the specific touch operation is performed on the display, start said accepting voice input when the text input field and the software keyboard are displayed on the display, and
said accepting voice input comprises:
converting voice inputted through the microphone into text, and
inputting the converted text into the text input field, and
during said accepting voice input, when the predetermined word corresponding to the specific voice command is recognized, the controller is configured to
determine whether voice is inputted through the microphone during two intervals of a predetermined duration before and after the predetermined word, respectively,
upon a determination that no voice is inputted through the microphone during both of the two intervals,
accept the predetermined word as an input of the specific voice command, and
perform processing associated with the specific voice command, and
upon a determination that voice is inputted through the microphone during any of the two intervals, recognize the predetermined word as voice to be converted to text,
convert the predetermined word into text, and
input the text converted from the predetermined word into the text input field, and
during said accepting voice input and displaying the text input field and the software keyboard,
upon a determination that the touch operation is performed, the controller is configured to terminate said accepting voice input, and
the specific touch operation includes an operation of selecting an address by touching the display.

* * * * *